(12) United States Patent
Zhang

(10) Patent No.: US 10,558,624 B2
(45) Date of Patent: Feb. 11, 2020

(54) SYSTEM AND METHOD FOR DATASTORE MANAGEMENT FRAMEWORK

(71) Applicant: SAP SE, Walldorf (DE)

(72) Inventor: Wenli Zhang, San Jose, CA (US)

(73) Assignee: SAP SE, Walldorf (DE)

( * ) Notice: Subject to any disclaimer, the term of this patent is extended or adjusted under 35 U.S.C. 154(b) by 428 days.

(21) Appl. No.: 15/369,475

(22) Filed: Dec. 5, 2016

(65) Prior Publication Data

US 2018/0157686 A1 Jun. 7, 2018

(51) Int. Cl.
*G06F 16/21* (2019.01)
*G06F 16/25* (2019.01)
*G06F 16/958* (2019.01)
*G06F 3/0484* (2013.01)

(52) U.S. Cl.
CPC .......... *G06F 16/211* (2019.01); *G06F 16/252* (2019.01); *G06F 16/986* (2019.01); *G06F 3/04842* (2013.01)

(58) Field of Classification Search
CPC ............. G06F 17/30126; G06F 3/0482; G06F 9/44505; G06F 17/30002; G06F 11/2069; G06F 17/3056
See application file for complete search history.

(56) References Cited

U.S. PATENT DOCUMENTS

| | | | | |
|---|---|---|---|---|
| 2008/0270369 A1* | 10/2008 | Myerson | ........... | G06F 17/30563 707/999.004 |
| 2011/0083138 A1* | 4/2011 | Sivasubramanian | ........ | G06F 17/30306 719/328 |
| 2014/0245196 A1* | 8/2014 | Zheng | ........ | G06F 8/38 715/762 |
| 2016/0098449 A1* | 4/2016 | Park | .................. | G06F 17/30448 707/718 |
| 2016/0344672 A1* | 11/2016 | Brisebois | ................ | H04L 51/26 707/999.004 |

* cited by examiner

*Primary Examiner* — Yuk Ting Choi
(74) *Attorney, Agent, or Firm* — Schwegman Lundberg & Woessner, P.A.

(57) ABSTRACT

Systems and methods for a datastore management framework are disclosed. In some example embodiments, a computer-implemented method comprises storing each one of a plurality of datastore configuration files in association with a corresponding one of a plurality of datastore types, receiving a request to create a datastore of a datastore type of the plurality of datastore types, selecting, from the plurality of datastore configuration files, a datastore configuration file associated with the datastore type, parsing the selected datastore configuration file, rendering a user interface for display based on the parsing of the selected datastore configuration file, receiving a user input via the rendered user interface, and creating the datastore based on the received user input, with the datastore being of the datastore type indicated by the request.

20 Claims, 13 Drawing Sheets

| DATASTORE TYPE | CONFIGURATION FILE |
|---|---|
| TYPE-1 | CONFIG-1 |
| TYPE-2 | CONFIG-2 |
| TYPE-3 | CONFIG-3 |
| TYPE-4 | CONFIG-4 |
| . . . | . . . |
| TYPE-N | CONFIG-N |

FIG. 4

```xml
<?xml version="1.0"?>
<UIDescriptor>
    <Parameters>
    <LayoutInfo>
        <GroupNode Name="credentials" Caption="Credentials">
            <ParameterNode Name="sap_host name"></ParameterNode>
            <ParameterNode Name="sap_authenticate_type"></ParameterNode>
            <ParameterNode Name="user"></ParameterNode>
            <ParameterNode Name="password"></ParameterNode>
            <ParameterNode Name="snc_lib"></ParameterNode>
            <ParameterNode Name="snc_myname"></ParameterNode>
            <ParameterNode Name="snc_partnername"></ParameterNode>
            <ParameterNode Name="snc_qop"></ParameterNode>
        </GroupNode>
        <GroupNode Name="locale" Caption="Locale">
        <GroupNode Name="sap" Caption="SAP">
            <ParameterNode Name="abap_execution_mode"></ParameteNode>
            <ParameterNode Name="sap_client"></ParameteNode>
            <ParameterNode Name="sap_system_number"></ParameteNode>
            <ParameterNode Name="sap_routing_string"></ParameteNode>
            <ParameterNode Name="abap_batch_mode"></ParameteNode>
            <ParameterNode Name="abap_target_host"></ParameteNode>
            <ParameterNode Name="abap_job_class"></ParameteNode>
            <!--<ParameterNode Name="loader_file_location"></ParameterNode>
            <ParameterNode Name="ldr_rfc_dest"></ParameteNode>
            <ParameterNode Name="sap_use_rfc_ini"></ParameteNode>
            <ParameterNode Name="rfc_ini_dest"></ParameteNode>
        </GroupNode>
        </GroupNode Name="load_balance" Caption="Load balanced">
        <!--
    </Layout Info>
</UIDescriptor>
```

FIG. 5

| 600 |
|---|

New Datastore      ✕

610 {

Name: *     611    | BW_Target_Jenny |

Description:     612

Type     613    | SAP BW Target ⌄ |

Agent: *     614    | Jenny_Group.Jenny_Laptop_A |

Credentials

620 {

Application server: *     621    | vanpgc48b11.dhcp.pgdev.corp |

Authentication:     622    | Password ⌄ |

User name: *     623    | 1817059 |

Password: *     624    | ●●●●●●●● |

Locale

SAP

Client number: *     625    | 800 |

System number: *     626    | 00 |

Routing String: *     627

[Reset] [Save] [Cancel]

*FIG. 6*

CONFIGURATION TABLES

| Name | Type | Description |
|---|---|---|
| 0TCTAPPL_QA_ATTR@R99CLNT800 | BW_MASTER_DATA_TRAN... | Application Component |

Details: 0TCTAPPL_QA_ATTR@R99CLNT800

Properties | Columns | Attributes

| Name | Data Type | Description |
|---|---|---|
| APPL | varchar(30) | Application Component |
| OBJVERS | varchar(1) | Object Version |
| LOGSYS | varchar(10) | BW System |

*FIG. 9*

# SYSTEM AND METHOD FOR DATASTORE MANAGEMENT FRAMEWORK

TECHNICAL FIELD

The present application relates generally to the technical field of data processing, and, in various embodiments, to systems and methods for a datastore management framework.

BACKGROUND

Current datastore management systems suffer from a lack of flexibility and extendibility, resulting in a difficult and lengthy configuration process.

BRIEF DESCRIPTION OF THE DRAWINGS

Some example embodiments of the present disclosure are illustrated by way of example and not limitation in the figures of the accompanying drawings, in which like reference numbers indicate similar elements.

FIG. 4 illustrates a mapping of each one of a plurality of datastore configuration files being stored in association with a corresponding one of a plurality of datastore types, in accordance with some example embodiments.

FIG. 5 illustrates a datastore configuration file, in accordance with some example embodiments.

FIG. 6 illustrates a user interface for creating a new datastore, in accordance with some example embodiments.

FIG. 9 illustrates a user interface displaying the imported metadata available for use within a datastore, in accordance with some example embodiments.

DETAILED DESCRIPTION

Figure 1:
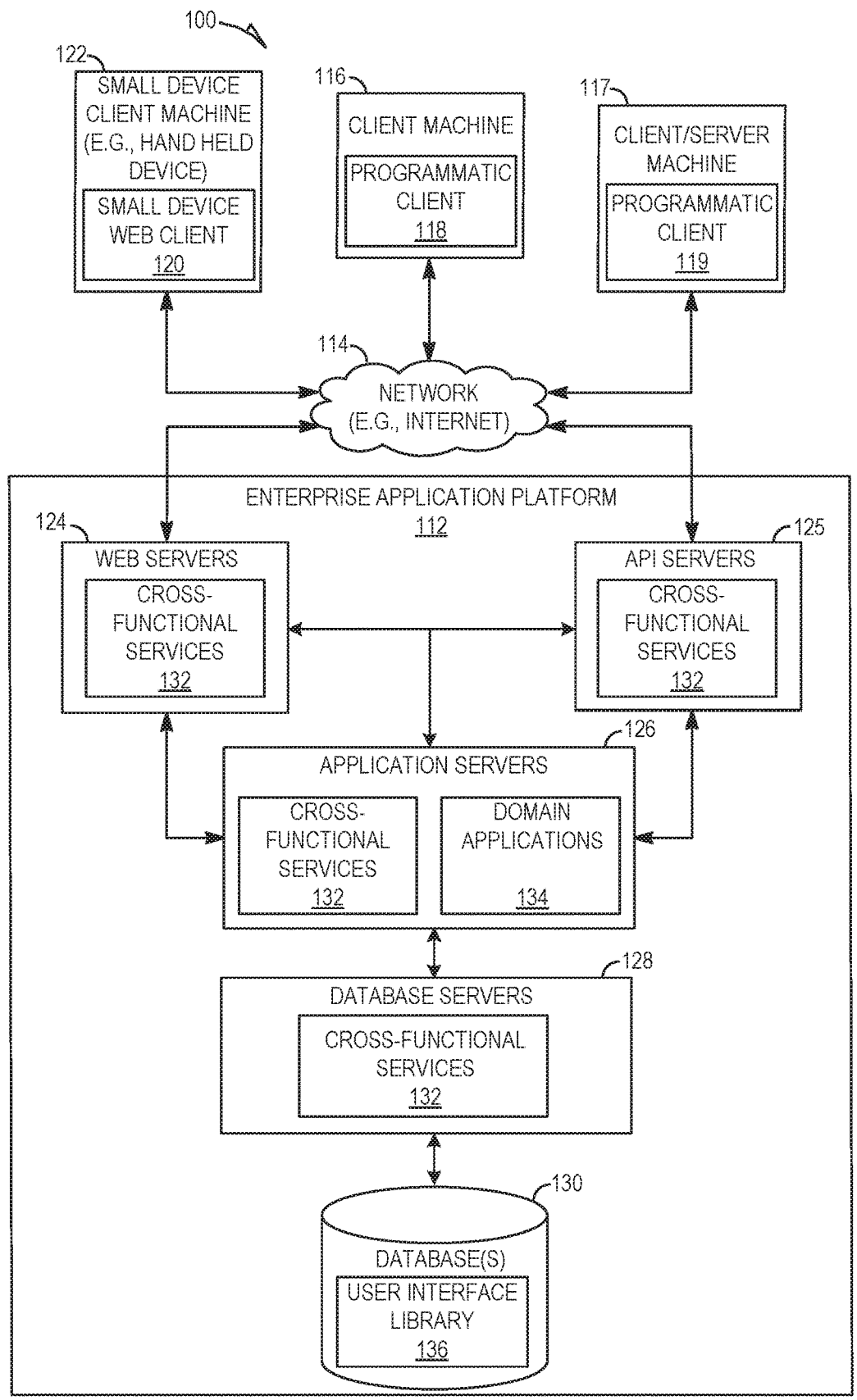
FIG. 1 is a network diagram illustrating a client-server system, in accordance with some example embodiments.

Example methods and systems for a datastore management framework are disclosed. In the following description, for purposes of explanation, numerous specific details are set forth in order to provide a thorough understanding of example embodiments. It will be evident, however, to one skilled in the art that the present embodiments can be practiced without these specific details.

A datastore is a repository for storing, managing and distributing data sets, such as on an enterprise level. In some example embodiments, a datastore incorporates all types of data that is produced, stored and used by an organization. The data of a datastore can be data that is at rest and used by one or more data-driven applications or services (e.g., online cloud-based applications).

In some example embodiments, when a software application needs data from a datastore, the software application connects to the datastore and retrieves the data from the datastore. In some example embodiments, the datastore management system of the present disclosure enables the retrieval of data from multiple datastores and provides the ability and functionality to repeatedly add new datastores, enabling the addition of new datastores using an easy, flexible, and extendable framework.

Currently, software applications have static datastore connectivity and data retrieval handling. The level of reusability of current methodologies is limited, and their expending of datastores affects the general structure of metadata handling, which is not suitable for handling large categorized datastore connectivity and metadata retrieval.

The framework of the present disclosure efficiently supports and enables the retrieval of data freely from multiple datastores. The present disclosure provides a flexible, reusable, and extendible framework to support adding new datastores freely and easily, as well as importing data from a datastore easily and in a constructed way. The framework of the present disclosure provides a flexible configuration methodology to support different datastore configurations. In some example embodiments, when a new datastore is to be added, the configuration properties are configured, and the new datastore type is added and related into the available datastore list. In some example embodiments, the system provides common functions for user interface handling and back-end handling for different datastores. A user interface layer of the system of the present disclosure may have a configuration parser configured to parse datastore configurations. In some example embodiments, when in run-time to create a datastore, the system parses the system configuration and provides a user interface for the user to choose different types of datastores that the user wants to create, and keys in all the necessary information for the datastore. Once the datastore is created, it may then be presented to the user in an available datastore list. The system can also provide the functionality to retrieve metadata from a datastore when a user wants to use certain metadata from the datastore. Different datastores can have different formats to import metadata from the datastore and the methodology of the present disclosure can be shared among different datastores. The datastore is ready to use once the needed data has been imported from the datastore. Users can also edit and delete the datastores.

The present disclosure provides technical solutions for datastore management and usage, involving datastore design, configuration, creation and metadata handling. It provides a systematic and extendable solution for critical applications that need large and extendable amount of datastores, and it provides an intelligent way of handling datastore configuration, accessary, connectivity, and metadata fetching. One technical effect of the system and method of the present disclosure are to provide a flexible, reusable, and extendible framework to support adding new datastores freely and easily. Additionally, other technical effects will be apparent from this disclosure as well.

In some example embodiments, a computer-implemented method comprises: storing a plurality of datastore configuration files, with each one of the plurality of datastore configuration files being stored in association with a corresponding one of a plurality of datastore types; receiving, from a computing device, a first request to create a first datastore, the first request indicating a first datastore type of the plurality of datastore types for the first datastore; selecting, from the plurality of datastore configuration files, a first datastore configuration file associated with the first datastore type; parsing the selected first datastore configuration file; rendering a first user interface for display on the computing device based on the parsing of the selected first datastore configuration file, the rendered first user interface being configured to receive user input from the computing device; receiving, from the computing device, a first user input via the rendered first user interface; and creating the first datastore based on the received first user input, the first datastore being of the first datastore type indicated by the first request.

In some example embodiments, the computer-implemented method further comprises: receiving, from the computing device, a second request to create a second datastore, the second request indicating a second datastore type, from the plurality of datastore types, for the second datastore; selecting a second datastore configuration file, from the plurality of datastore configuration files, associated with the second datastore type; parsing the selected second datastore configuration file; rendering a second user interface for display on the computing device based on the parsing of the selected second datastore configuration file, the rendered second user interface being configured to receive user input from the computing device; receiving, from the computing device, a second user input via the rendered second user interface; and creating the second datastore based on the received second user input, the second datastore being of the second datastore type indicated by the second request.

In some example embodiments, the computer-implemented method further comprises: receiving a request to add a new datastore type to the plurality of datastore types; receiving a new datastore configuration file for the new datastore type; storing the new datastore configuration file for the new datastore type, the new datastore configuration file being added to the plurality of datastore configuration files, and the new datastore type being added to the plurality of datastore types; receiving metadata for the new datastore type; storing the metadata in association with the new datastore type; and displaying, on the computing device, a selectable option to add the metadata to a new datastore based on the new datastore being of the new datastore type.

In some example embodiments, each one of the plurality of datastore configuration files comprises a corresponding Extensible Markup Language (XML) file.

In some example embodiments, the rendered user interface comprises at least one field configured to receive user input from the computing device. In some example embodiments, the computer-implemented method further comprises receiving the first user input via at least one graphic user interface element. In some example embodiments, the at least one graphic user interface element comprises at least one of a text field, a menu, and a checkbox.

The methods or embodiments disclosed herein may be implemented as a computer system having one or more modules (e.g., hardware modules or software modules). Such modules may be executed by one or more hardware processors of the computer system. In some example embodiments, a non-transitory machine-readable storage device can store a set of instructions that, when executed by at least one processor, causes the at least one processor to perform the operations and method steps discussed within the present disclosure.

The details of one or more variations of the subject matter described herein are set forth in the accompanying drawings and the description below. Other features and advantages of the subject matter described herein will be apparent from the description and drawings, and from the claims.

FIG. 1 is a network diagram illustrating a client-server system 100, in accordance with some example embodiments. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the example enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The cross-functional services 132 can include relational database modules to provide support services for access to the database(s) 130, which includes a user interface library 136. The web servers 124, API servers 125, application servers 126, and database servers 128 can host cross-functional services 132. The application servers 126 can further host domain applications 134.

The cross-functional services 132 provide services to users and processes that utilize the enterprise application platform 112. For instance, the cross-functional services 132 can provide portal services (e.g., web services), database services and connectivity to the domain applications 134 for users that operate the client machine 116, the client/server machine 117 and the small device client machine 122. In addition, the cross-functional services 132 can provide an environment for delivering enhancements to existing applications and for integrating third-party and legacy applications with existing cross-functional services 132 and domain applications 134. Further, while the system 100 shown in FIG. 1 employs a client-server architecture, the embodiments of the present disclosure are of course not limited to such an architecture, and could equally well find application in a distributed, or peer-to-peer, architecture system.

The enterprise application platform 112 can implement partition level operation with concurrent activities. For example, the enterprise application platform 112 can implement a partition level lock, a schema lock mechanism, manage activity logs for concurrent activity, generate and maintain statistics at the partition level, and efficiently build global indexes. The enterprise application platform 112 is described in greater detail below in conjunction with FIG. 2.

Figure 2:
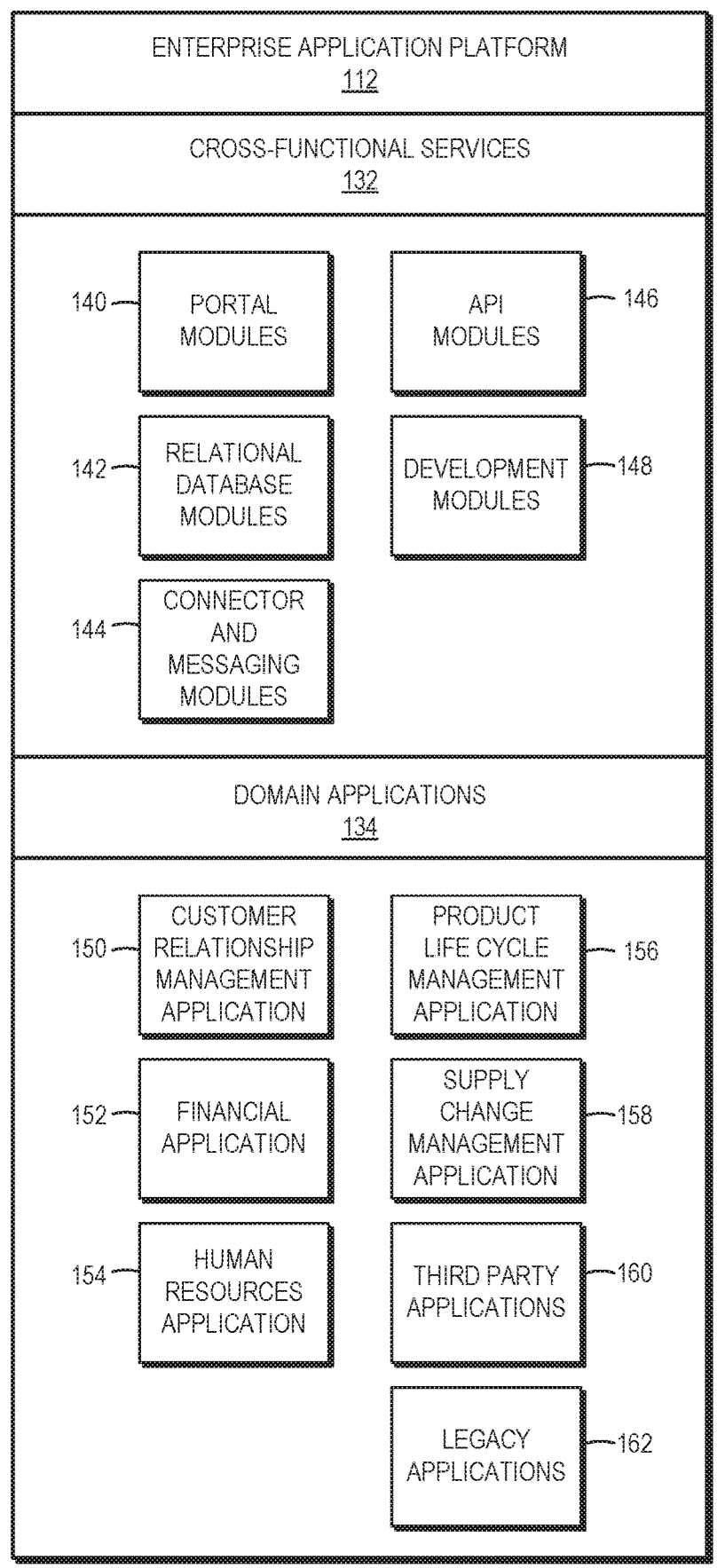
FIG. 2 is a block diagram illustrating enterprise applications and services in an enterprise application platform, in accordance with some example embodiments.

FIG. 2 is a block diagram illustrating enterprise applications and services in an enterprise application platform 112, in accordance with an example embodiment. The enterprise application platform 112 can include cross-functional services 132 and domain applications 134. The cross-functional services 132 can include portal modules 140, relational database modules 142, connector and messaging modules 144, API modules 146, and development modules 148.

The portal modules 140 can enable a single point of access to other cross-functional services 132 and domain applications 134 for the client machine 116, the small device client machine 122, and the client/server machine 117. The portal modules 140 can be utilized to process, author and maintain web pages that present content (e.g., user interface elements and navigational controls) to the user. In addition, the portal modules 140 can enable user roles, a construct that associates a role with a specialized environment that is utilized by a user to execute tasks, utilize services and exchange information with other users and within a defined scope. For example, the role can determine the content that is available to the user and the activities that the user can perform. The portal modules 140 include a generation module, a communication module, a receiving module and a regenerating module. In addition the portal modules 140 can comply with web services standards and/or utilize a variety of Internet technologies including Java, J2EE, SAP's Advanced Business Application Programming Language (ABAP) and Web Dynpro, XML, JCA, JAAS, X.509, LDAP, WSDL, WSRR, SOAP, UDDI and Microsoft .NET.

The relational database modules 142 can provide support services for access to the database(s) 130, which includes a user interface library 136. The relational database modules 142 can provide support for object relational mapping, database independence and distributed computing. The relational database modules 142 can be utilized to add, delete, update and manage database elements. In addition, the relational database modules 142 can comply with database standards and/or utilize a variety of database technologies including SQL, SQLDBC, Oracle, MySQL, Unicode, JDBC, or the like.

The connector and messaging modules 144 can enable communication across different types of messaging systems that are utilized by the cross-functional services 132 and the domain applications 134 by providing a common messaging application processing interface. The connector and messaging modules 144 can enable asynchronous communication on the enterprise application platform 112.

The API modules 146 can enable the development of service-based applications by exposing an interface to existing and new applications as services. Repositories can be included in the platform as a central place to find available services when building applications.

The development modules 148 can provide a development environment for the addition, integration, updating and extension of software components on the enterprise application platform 112 without impacting existing cross-functional services 132 and domain applications 134.

Turning to the domain applications 134, the customer relationship management application 150 can enable access to and can facilitate collecting and storing of relevant personalized information from multiple data sources and business processes. Enterprise personnel that are tasked with developing a buyer into a long-term customer can utilize the customer relationship management applications 150 to provide assistance to the buyer throughout a customer engagement cycle.

Enterprise personnel can utilize the financial applications 152 and business processes to track and control financial transactions within the enterprise application platform 112. The financial applications 152 can facilitate the execution of operational, analytical and collaborative tasks that are associated with financial management. Specifically, the financial applications 152 can enable the performance of tasks related to financial accountability, planning, forecasting, and managing the cost of finance.

The human resource applications 154 can be utilized by enterprise personnel and business processes to manage, deploy, and track enterprise personnel. Specifically, the human resource applications 154 can enable the analysis of human resource issues and facilitate human resource decisions based on real time information.

The product life cycle management applications 156 can enable the management of a product throughout the life cycle of the product. For example, the product life cycle management applications 156 can enable collaborative engineering, custom product development, project management, asset management and quality management among business partners.

The supply chain management applications 158 can enable monitoring of performances that are observed in supply chains. The supply chain management applications 158 can facilitate adherence to production plans and on-time delivery of products and services.

The third-party applications 160, as well as legacy applications 162, can be integrated with domain applications 134 and utilize cross-functional services 132 on the enterprise application platform 112.

Figure 3:
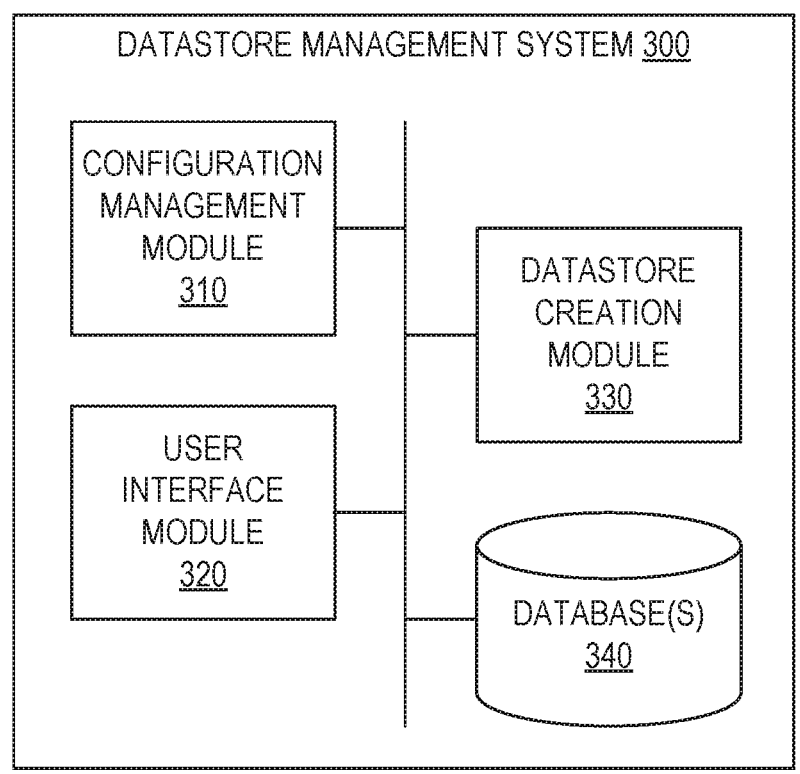
FIG. 3 is a block diagram illustrating a datastore management system, in accordance with some example embodiments.

FIG. 3 is a block diagram illustrating a datastore management system 300, in accordance with some example embodiments. In some example embodiments, the datastore management system 300 comprises any combination of one or more of a configuration management module 310, a user interface module 320, a datastore creation module 330, and one or more databases 340.

In some example embodiments, the modules 310, 320, and 330 and the database(s) 340 reside on a machine having a memory and at least one processor (not shown). In some example embodiments, the modules 310, 320, and 330 and the database(s) 340 reside on the same machine, while in other example embodiments, one or more of modules 310, 320, and 330 and database(s) 340 reside on separate remote machines that communicate with each other via a network (e.g., network 114 in FIG. 1). In some example embodiments, the modules 310, 320, and 330 and the database(s) 340 can be incorporated into the enterprise application platform 112 in FIG. 1 (e.g., on application server(s) 126). However, it is contemplated that other configurations are also within the scope of the present disclosure.

In some example embodiments, the configuration management module 310 is configured to store a plurality of datastore configuration files, with each one of the plurality of datastore configuration files being stored in association with a corresponding one of a plurality of datastore types. The database management system 300 may accommodate many different types of datastores, with each datastore storing, managing and distributing different data sets. In some example embodiments, the plurality of datastore configuration files are stored in association with the plurality of datastore types in database(s) 340. The plurality of datastore configuration files may be stored as Extensible Markup Language (XML) files. However, the plurality of configuration files may be stored as other types of files as well.

FIG. 4 illustrates a mapping 400 of each one of a plurality of datastore configuration files being stored in association with a corresponding one of a plurality of datastore types, in accordance with some example embodiments. For example, in the example embodiment shown in FIG. 4, configuration file CONFIG-1 is stored in association with datastore type TYPE-1, configuration file CONFIG-2 is stored in association with datastore type TYPE-2, configuration file CONFIG-3 is stored in association with datastore type TYPE-3, configuration file CONFIG-4 is stored in association with datastore type TYPE-4, and so on and so forth to configuration file CONFIG-N sotred in association with datastore type TYPE-N. It is contemplated that the plurality of datastore configuration files may comprise any number of datastore configuration files that constitutes a plurality. In some example embodiments, the mapping 400 of each one of the plurality of datastore configuration files is stored in association with the corresponding one of the plurality of datastore types in database(s) 340.

FIG. 5 illustrates a datastore configuration file 500, in accordance with some example embodiments. In some example embodiments, the datastore configuration file comprises a corresponding Extensible Markup Language (XML) file. The datastore configuration file can include parameters to be used in rendering a user interface that is to be used by a user to create a new datastore. Such parameters may include, but are not limited to, parameters related to credential information for the new datastore (e.g., host server, authentication type, user name, password) and location information for the new datastore (e.g., client number, system number, routing suing). Other parameters are also within the scope of the present disclosure.

Referring back to FIG. 3, in some example embodiments, the user interface module 320 is configured to receiving, from a computing device, a request to create a new datastore. The request can indicate a datastore type for the new datastore that is to be created. For example, the user interface module 320 can cause a user interface to be displayed on the computing device, with the user interface comprising one or more user interface elements configured to receive user input indicating a datastore type, as well as other user input.

FIG. 6 illustrates a user interface 600 for creating a new datastore, in accordance with some example embodiments. As seen in FIG. 6, the user interface 600 may comprise a first portion 610 that is initially displayed on a computing device of a user that is attempting to create a new datastore. The first portion 610 comprises one or more user interface elements configured to receive user input, such as text field 611 configured to receive name or identification of the new datastore, text field 612 configured to receive a description of the new datastore, drop-down menu 613 configured to receive a selection or other indication of the type of datastore for the new datastore, and drop-down menu 614 configured to receive a selection or other indication of the user agent that is to be associated with the creation of the new datastore (e.g., the user creating the new datastore). In some example embodiment, the drop-down menu 613, or another user interface element configured to enable the user to provide input indicating a type of datastore, is configured to enable the user to select the type of datastore from amongst the plurality of datastore types for which the datastore configuration files are stored, thus enabling the user to select a datastore type from amongst a wide variety of datastore types.

In some example embodiments, the user interface module 320 is configured to use the received datastore type (e.g., the selection of the type of datastore from drop-down menu 613 in FIG. 6) to configure and render a second portion 620 of the user interface 600 to be displayed to the user in the process of creating a new datastore. For example, the user interface module 320 may be configured to selecting, from the plurality of datastore configuration files, the datastore configuration file associated with the received datastore type, such as by accessing the mapping 400 stored in database(s) 340. In some example embodiments, the user interface module 320 is configured to parse the selected datastore configuration file, and then render the user interface 600, or the second portion 620 of the user interface 600, for display on the computing device of the user based on the parsing of the selected datastore configuration file.

As seen in the example embodiment of FIG. 6, the rendered second portion 620 of the user interface 600 may be configured to receive user input from the computing device of the user, such as via one or more user interface elements. For example, the second portion 620 of the user interface 600 may comprise a text field 621 configured to receive an identification of an application server for the new datastore, a drop-down menu 622 configured to receive a selection of an authentication type for the new datastore, a text field 623 configured to receive a name or other identification of the user, a text field 624 configured to receive a password, a text field 625 configured to receive a client number for the new datastore, a text field 626 configured to receive a system number for the new datastore, and a text field 627 configured to receive a routing string for the new datastore. It is contemplated that other types of user interface elements for receiving user input may also be used within the second portion 620 of the user interface 600. In some example embodiments, the user interface module 320 is configured to receive, from a computing device, user input via the second portion 620 of the user interface 600, as described above.

In some example embodiments, the datastore creation module 330 is configured to create a datastore based on the user input received via the second portion 620 of the user interface 600. This new datastore is of the datastore type indicated by the request to create the new datastore, such as the datastore type selected by the user via drop-down menu 613 in FIG. 6). The creation of the datastore based on the user input received via the second portion 620 of the user interface 600 can be triggered by a request to save the new datastore, such as via a selection of a user interface element (e.g., the "Save" button in FIG. 6), which may cause the new configured datastore to be saved in the datastore management system 300.

Figure 7:
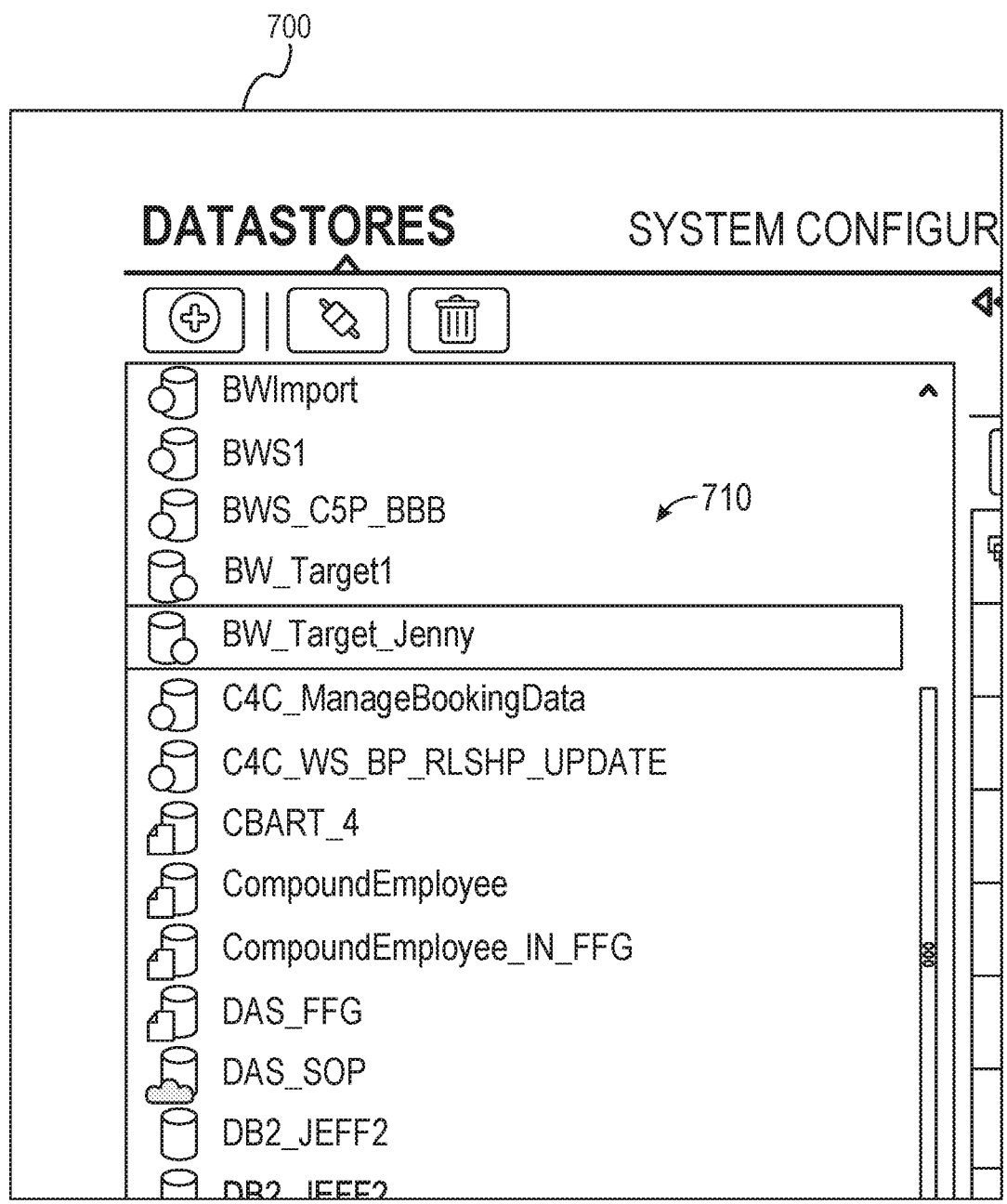
FIG. 7 illustrates a user interface displaying the newly-created datastore in a list of available datastores, in accordance with some example embodiments.
Figure 8:
FIG. 8 illustrates a user interface displaying a list of metadata available to be imported into a datastore, in accordance with some example embodiments.

In some example embodiments, after a new datastore is created and saved, it may be made available to a user for use in operations such as datastore connection and metadata fetching. FIG. 7 illustrates a user interface 700 displaying the newly-created datastore (e.g., "BW_Target_Jenny" created in FIG. 6) in a list of available datastores 710, in accordance with some example embodiments. In some example embodiments, the user interface 700 is configured to enable a user to select any of the available datastores 710 for use in operations. Selection of one of the available datastores 710 may cause the datastore management system 300 to test a connection with the selected datastore 710 and enable a user to obtain metadata for the selected datastore 710. FIG. 8 illustrates a user interface 800 displaying a list of metadata 810 available to be imported into a selected datastore, in accordance with some example embodiments. In some example embodiments, the user interface 800 is configured to enable a user to select any of the available metadata 810 to be imported into the selected datastore. In response to any of the available metadata 810 being selected to be imported into the selected datastore, the datastore management system 300 may save the selected metadata 810 to a datastore metadata model layer of the datastore management system 300 for subsequent use in association with the corresponding datastore. FIG. 9 illustrates a user interface 900 displaying the imported metadata available for use within a datastore, in accordance with some example embodiments.

As previously discussed, the present disclosure provides a methodology for datastore configuration in a flexible and extendable way, datastore configuration parsing, datastore configuration creation rendering, datastore configuration available list, datastore connection, and datastore metadata retrieval handling. When a user wants to add a new datastore for future use, the user can use the features of the present disclosure to first configure the datastore configuration properties of a datastore configuration file, and then add the new datastore type to the datastore management system 300 and add it into the available datastore list for subsequent use by users of the datastore management system 300. The datastore management system 300 can provide common functions for user interface and back-end handling for different datastores. The datastore management system 300 may comprise a parser to parse the configuration properties into user interface elements for datastore creation and editing. When being used during run-time to create a datastore, the datastore management system 300 can provides a user interface for a user to choose different types of datastores that the user wants to create. Once the datastore management system 300 creates and saves the datastore, the datastore management system 300 provides the datastore in the available datastore list. A user can then test a connection with the datastore, retrieve metadata from the datastore, and view data using the datastore management system 300. The datastore management system 300 provides a framework to obtain metadata and other data from a datastore when the user wants to use certain data from the datastore.

Figure 10:
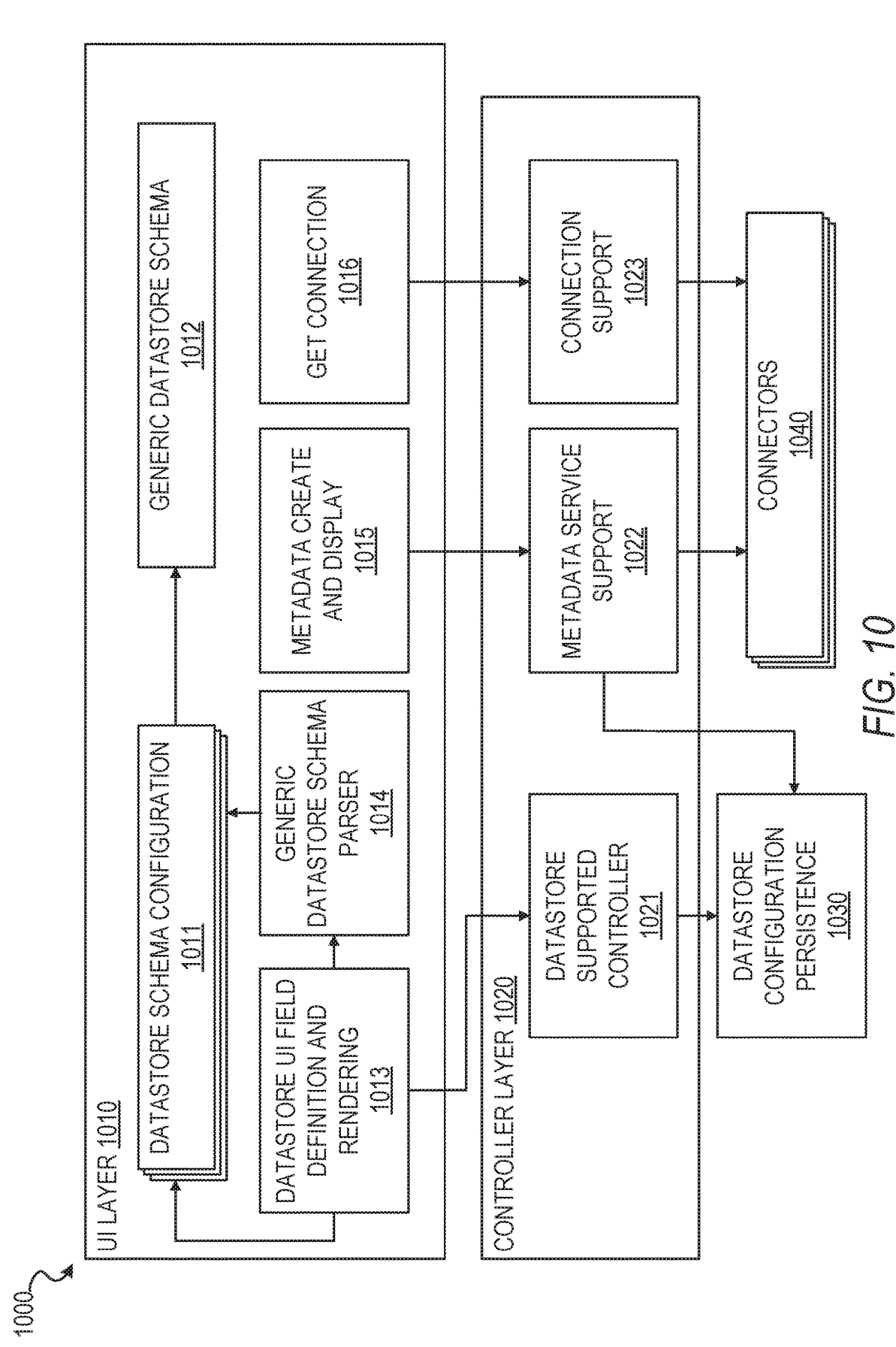
FIG. 10 is a block diagram illustrating a datastore management framework, in accordance with some example embodiments.

FIG. 10 is a block diagram illustrating a datastore management framework 1000, in accordance with some example embodiments. In some example embodiments, the datastore management framework 1000 comprises the following layers: a user interface or view layer 1010 for datastore configuration, parsing, creation, and rendering, a controller layer 1020 for datastore-related business logic processing, and a persistence layer interaction and model layer 1030 for saving the datastore configurations and metadata retrieved from datastore adapters. The components of each layer have access to each other, such that they can communicate with each other.

In some example embodiments, at the user interface layer 1010, a datastore configuration will be created at 1011 according to a generic datastore schema at 1012. The term "generic" is used herein to refer to the ability to be used for different datastores, and is not used to imply that any such component or feature is known or commonly used. A datastore creation UI at 1013 will use a parser at 1014 to parse a datastore configuration and render it into different UI elements in the datastore creation UI 1013. In some example embodiments, the datastore creation UI 1013 provides different types of selections for different types of datastores and provides different datastore configuration for different datastores. A user can fill out the required information in the datastore creation UI 1013. When the user is finished inputting information, the datastore management framework 1000 saves the datastore and the datastore is available in the datastore management system 300. The user can establish a datastore connection at 1016 to see if the created datastore works or not, as well as to access and retrieve metadata for the working datastore through metadata fetching at 1015.

At the controller layer 1020, the datastore management framework 1000 provides functions for datastore creation, deletion, editing, saving and metadata retrieval, editing, and saving that support the user interface's required actions at 1021. When the user interface layer 1010 triggers the creation of a datastore and the user keys in the required fields, when the user triggers a save action for the datastore, the data collected from user interface layer 1010 will pass to the controller at 1021 and the controller 1021 will save the data into the persistence layer 1030. When a user edits a datastore, the controller layer 1020 can retrieve datastore information from the persistence layer 1030 and return the information to the user interface layer 1010, where the user interface layer 1010 can render the data according to the retrieved data information. When a user wants to get metadata of a datastore, the user interface layer 1010 at 1015 can pass an identification of the datastore to a metadata support service at 1022 in the controller layer 1020, which will get the related datastore information according to the identification and use the information for metadata retrieval from one or more of the connectors 1040, which connect the controller layer 1020 to the datastores. The retrieved metadata can then be sent back to the user interface layer 1010 from the controller layer 1020.

At the persistence layer 1030, a datastore object can be persisted with all of the information related to the datastore object, as well as configuration of datastore being saved as properties of the datastore object. When a user creates a new datastore, the new datastore object will be created. When a user modifies a datastore, related information of that datastore object will be updated, and when a user deletes a datastore, the datastore object will be deleted. When a user imports or adds new metadata, the selected metadata will be added into a metadata table. When a user reimports or modifies metadata, the modified information will be saved to the metadata table. And when a user deletes metadata, the metadata record will be deleted.

Figure 11:
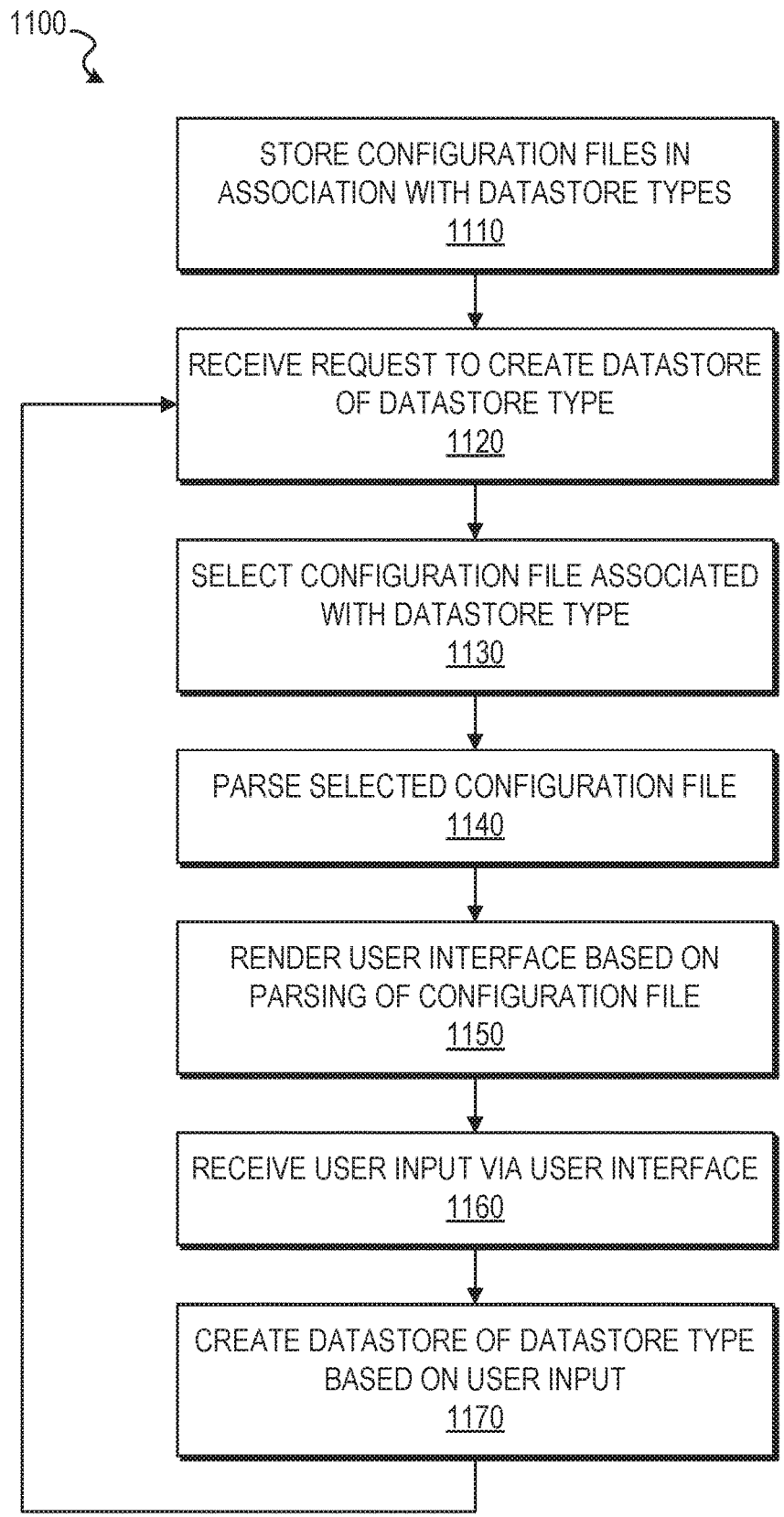
FIG. 11 is a flowchart illustrating a method of creating a datastore, in accordance with some example embodiments.

FIG. 11 is a flowchart illustrating a method 1100 of creating a datastore, in accordance with some example embodiments. Method 1100 can be performed by processing logic that can comprise hardware (e.g., circuitry, dedicated logic, programmable logic, microcode, etc.), software (e.g., instructions run on a processing device), or a combination thereof. In one example embodiment, the method 1100 is performed by the database management system 300 of FIG. 3, or any combination of one or more of its components or modules (e.g., configuration management module 310, user interface module 320, datastore creation module 330), as described above.

At operation 1110, the datastore management system 300 stores a plurality of datastore configuration files, with each one of the plurality of datastore configuration files being stored in association with a corresponding one of a plurality of datastore types. In some example embodiments, each one of the plurality of datastore configuration files comprises a corresponding XML file. At operation 1120, the datastore management system 300 receives, from a computing device, a request to create a datastore, with the request indicating a datastore type of the plurality of datastore types for the datastore. At operation 1130, the datastore management system 300 selects, from the plurality of datastore configuration files, a datastore configuration file associated with the datastore type. At operation 1140, the datastore management system 300 parses the selected datastore configuration file. At operation 1150, the datastore management system 300 renders a user interface for display on the computing device based on the parsing of the selected datastore configuration file, with the rendered user interface being configured to receive user input from the computing device. At operation 1160, the datastore management system 300 receives, from the computing device, a user input via the rendered user interface. At operation 1170, the datastore management system 300 creates the datastore based on the received user input, with the datastore being of the datastore type indicated by the request. The method 1100 may then return to operation 1120, where the datastore management system 300 receives, from the same computing device or a different computing device, another request to create another datastore.

It is contemplated that any of the other features described within the present disclosure can be incorporated into method 1100.

Figure 12:
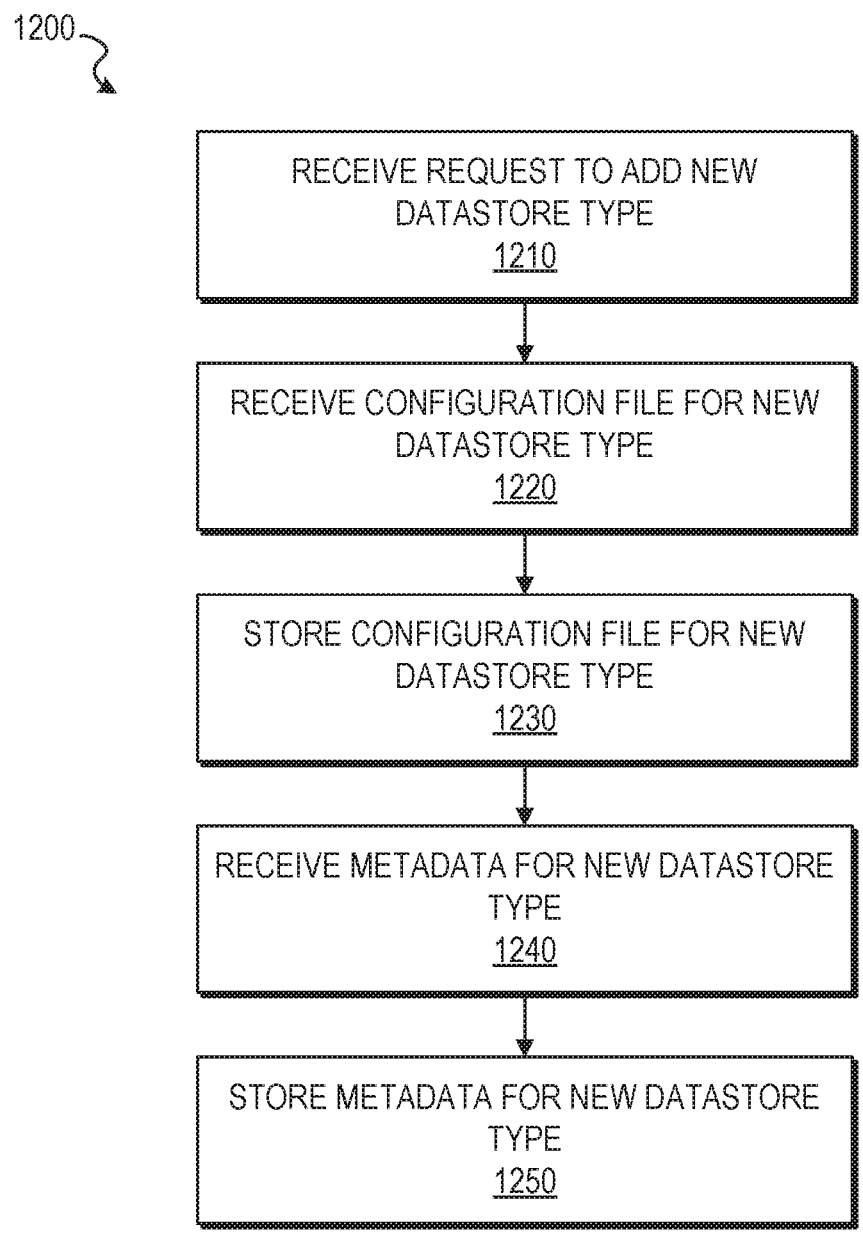
FIG. 12 is a flowchart illustrating a method of adding a new datastore type to a datastore management system, in accordance with some example embodiments.

FIG. 12 is a flowchart illustrating a method 1200 of adding a new datastore type to a datastore management system, in accordance with some example embodiments. Method 1200 can be performed by processing logic that can comprise hardware (e.g., circuitry, dedicated logic, programmable logic, microcode, etc.), software (e.g., instructions run on a processing device), or a combination thereof. In one example embodiment, the method 1200 is performed by the database management system 300 of FIG. 3, or any combination of one or more of its components or modules (e.g., configuration management module 310, user interface module 320, datastore creation module 330), as described above.

At operation 1210, the datastore management system 300 receives a request to add a new datastore type to an existing plurality of datastore types. At operation 1220, the datastore management system 300 receives a new datastore configuration file for the new datastore type. At operation 1230, the datastore management system 300 stores the new datastore configuration file for the new datastore type, with the new datastore configuration file being added to the plurality of datastore configuration files, and the new datastore type being added to the plurality of datastore types. At operation 1240, the datastore management system 300 receives metadata for the new datastore type. At operation 1250, the datastore management system 300 stores the metadata in association with the new datastore type. As a result of these operations of method 1200, a selectable option to add the metadata to a new datastore can be displayed on a computing device of a user based on the new datastore being of the new datastore type.

It is contemplated that any of the other features described within the present disclosure can be incorporated into method 1200.

It is contemplated that other use cases are also within the scope of the present disclosure.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 104 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 13:
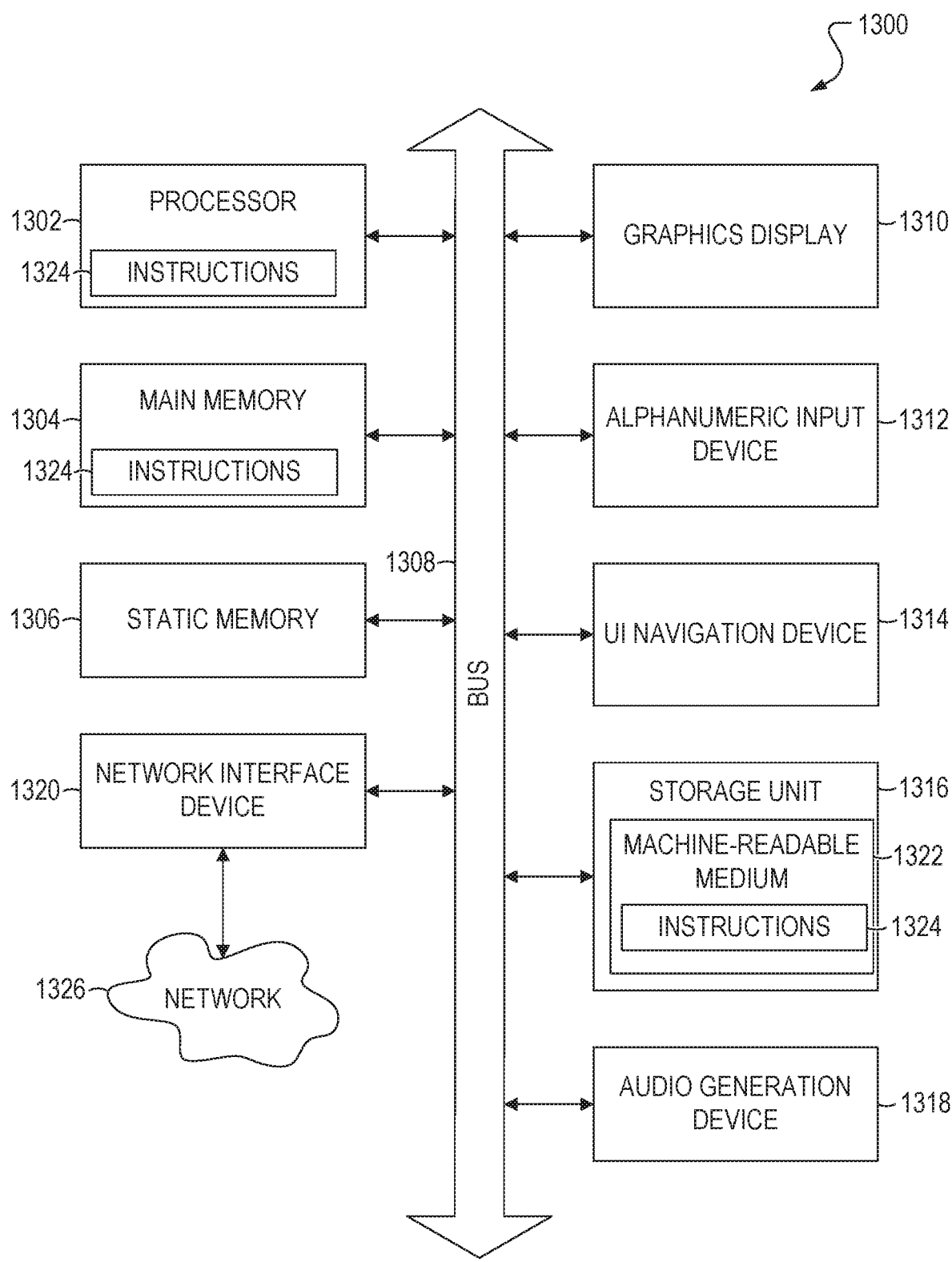
FIG. 13 is a block diagram of an example computer system on which methodologies described herein can be executed, in accordance with some example embodiments.

FIG. 13 is a block diagram of a machine in the example form of a computer system 1300 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 includes a processor 1302 (e.g., a central processing unit (CPU), a graphics processing unit (GPU) or both), a main memory 1304 and a static memory 1306, which communicate with each other via a bus 1308. The computer system 1300 may further include a graphics or video display unit 1310 (e.g., a liquid crystal display (LCD) or a cathode ray tube (CRT)). The computer system 1300 also includes an alphanumeric input device 1312 (e.g., a keyboard), a user interface (UI) navigation (or cursor control) device 1314 (e.g., a mouse), a storage unit (e.g., a disk drive unit) 1316, an audio or signal generation device 1318 (e.g., a speaker), and a network interface device 1320.

The storage unit 1316 includes a machine-readable medium 1322 on which is stored one or more sets of data structures and instructions 1324 (e.g., software) embodying or utilized by any one or more of the methodologies or functions described herein. The instructions 1324 may also reside, completely or at least partially, within the main memory 1304 and/or within the processor 1302 during execution thereof by the computer system 1300, the main memory 1304 and the processor 1302 also constituting machine-readable media. The instructions 1324 may also reside, completely or at least partially, within the static memory 1306.

While the machine-readable medium 1322 is shown in an example embodiment to be a single medium, the term "machine-readable medium" may include a single medium or multiple media (e.g., a centralized or distributed database, and/or associated caches and servers) that store the one or more instructions 1324 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 1324 may further be transmitted or received over a communications network 1326 using a transmission medium. The instructions 1324 may be transmitted using the network interface device 1320 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

The following numbered examples are embodiments.
1. A system comprising:
at least one processor; and a non-transitory computer-readable medium storing executable instructions that, when executed, cause the at least one processor to perform operations comprising:
  storing a plurality of datastore configuration files, each one of the plurality of datastore configuration files being stored in association with a corresponding one of a plurality of datastore types;
  receiving, from a computing device, a first request to create a first datastore, the first request indicating a first datastore type of the plurality of datastore types for the first datastore;
  selecting, from the plurality of datastore configuration files, a first datastore configuration file associated with the first datastore type;
  parsing the selected first datastore configuration file;
  rendering a first user interface for display on the computing device based on the parsing of the selected first datastore configuration file, the rendered first user interface being configured to receive user input from the computing device;
  receiving, from the computing device, a first user input via the rendered first user interface; and
  creating the first datastore based on the received first user input, the first datastore being of the first datastore type indicated by the first request.

2. The system of example 1, wherein the operations further comprise:
  receiving, from the computing device, a second request to create a second datastore, the second request indicating a second datastore type, from the plurality of datastore types, for the second datastore;
  selecting a second datastore configuration file, from the plurality of datastore configuration files, associated with the second datastore type;
  parsing the selected second datastore configuration file;
  rendering a second user interface for display on the computing device based on the parsing of the selected second datastore configuration file, the rendered second user interface being configured to receive user input from the computing device;
  receiving, from the computing device, a second user input via the rendered second user interface; and
  creating the second datastore based on the received second user input, the second datastore being of the second datastore type indicated by the second request.

3. The system of example 1 or example 2, wherein the operations further comprise:
  receiving a request to add a new datastore type to the plurality of datastore types;
  receiving a new datastore configuration file for the new datastore type;
  storing the new datastore configuration file for the new datastore type, the new datastore configuration file being added to the plurality of datastore configuration files, and the new datastore type being added to the plurality of datastore types;
  receiving metadata for the new datastore type;
  storing the metadata in association with the new datastore type; and
  displaying, on the computing device, a selectable option to add the metadata to a new datastore based on the new datastore being of the new datastore type.

4. The system of any one of examples 1 to 3, wherein each one of the plurality of datastore configuration files comprises a corresponding Extensible Markup Language (XML) file.

5. The system of any one of examples 1 to 4, wherein the rendered user interface comprises at least one field configured to receive user input from the computing device.

6. The system of example 5, wherein the operations further comprise receiving the first user input via at least one graphic user interface element.

7. The system of example 6, wherein the at least one graphic user interface element comprises at least one of a text field, a menu, and a checkbox.

8. A computer-implemented method comprising:
  storing, by a machine having a memory and at least one hardware processor, a plurality of datastore configuration files, each one of the plurality of datastore configuration files being stored in association with a corresponding one of a plurality of datastore types;
  receiving, from a computing device, a first request to create a first datastore, the first request indicating a first datastore type of the plurality of datastore types for the first datastore;
  selecting, from the plurality of datastore configuration files, a first datastore configuration file associated with the first datastore type;
  parsing the selected first datastore configuration file;
  rendering a first user interface for display on the computing device based on the parsing of the selected first datastore configuration file, the rendered first user interface being configured to receive user input from the computing device;
  receiving, from the computing device, a first user input via the rendered first user interface; and
  creating the first datastore based on the received first user input, the first datastore being of the first datastore type indicated by the first request.

9. The computer-implemented of example 8, further comprising:
  receiving, from the computing device, a second request to create a second datastore, the second request indicating a second datastore type, from the plurality of datastore types, for the second datastore;
  selecting a second datastore configuration file, from the plurality of datastore configuration files, associated with the second datastore type;
  parsing the selected second datastore configuration file;
  rendering a second user interface for display on the computing device based on the parsing of the selected second datastore configuration file, the rendered second user interface being configured to receive user input from the computing device;
  receiving, from the computing device, a second user input via the rendered second user interface; and
  creating the second datastore based on the received second user input, the second datastore being of the second datastore type indicated by the second request.

10. The computer-implemented method of example 8 or example 9, further comprising:
  receiving a request to add a new datastore type to the plurality of datastore types;
  receiving a new datastore configuration file for the new datastore type;
  storing the new datastore configuration file for the new datastore type, the new datastore configuration file being added to the plurality of datastore configuration files, and the new datastore type being added to the plurality of datastore types;
  receiving metadata for the new datastore type;
  storing the metadata in association with the new datastore type; and displaying, on the computing device, a selectable option to add the metadata to a new datastore based on the new datastore being of the new datastore type.

11. The computer-implemented method of any one of examples 8 to 10, wherein each one of the plurality of datastore configuration files comprises a corresponding Extensible Markup Language (XML) file.

12. The computer-implemented method of any one of examples 8 to 11, wherein the rendered user interface comprises at least one field configured to receive user input from the computing device.

13. The computer-implemented method of example 12, further comprising receiving the first user input via at least one graphic user interface element.

14. The computer-implemented method of example 13, wherein the at least one graphic user interface element comprises at least one of a text field, a menu, and a checkbox.

19. A non-transitory machine-readable storage medium, tangibly embodying a set of instructions that, when executed by at least one processor, causes the at least one processor to perform the method of any one of examples 8 to 14.

21. A machine-readable medium carrying a set of instructions that, when executed by at least one processor, causes the at least one processor to carry out the method of any one of examples 8 to 14.

Each of the features and teachings disclosed herein can be utilized separately or in conjunction with other features and teachings to provide a system and method for selective gesture interaction using spatial volumes. Representative examples utilizing many of these additional features and teachings, both separately and in combination, are described in further detail with reference to the attached figures. This detailed description is merely intended to teach a person of skill in the art further details for practicing preferred aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but is not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The example methods or algorithms presented herein are not inherently related to any particular computer or other apparatus. Various general purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
   at least one processor; and
   a non-transitory computer-readable medium storing executable instructions that, when executed, cause the at least one processor to perform operations comprising:
      storing a plurality of datastore configuration files, each one of the plurality of datastore configuration files being stored in association with a corresponding one of a plurality of datastore types, and each one of the plurality of datastore configuration files including parameters to be used in rendering a corresponding user interface to be used in creating a datastore of the corresponding one of the plurality of datastore types;
      receiving, from a computing device, a first request to create a first datastore, the first request indicating a first datastore type of the plurality of datastore types for the first datastore;
      selecting, from the plurality of datastore configuration files, a first datastore configuration file associated with the first datastore type;
      parsing the selected first datastore configuration file;
      rendering a first user interface for display on the computing device based on the parsing of the selected first datastore configuration file, the rendered first user interface being configured to receive user input from the computing device;
      receiving, from the computing device, a first user input via the rendered first user interface;
      creating the first datastore based on the received first user input, the first datastore being of the first datastore type indicated by the first request;
      receiving a request to add a new datastore type to the plurality of datastore types;
      receiving a new datastore configuration file for the new datastore type;
      storing the new datastore configuration file for the new datastore type, the new datastore configuration file being added to the plurality of datastore configuration files, and the new datastore type being added to the plurality of datastore types;
      receiving metadata for the new datastore type;
      storing the metadata in association with the new datastore type; and
      displaying, on the computing device, a selectable option to add the metadata to a new datastore based on the new datastore being of the new datastore type.

2. The system of claim 1, wherein the operations further comprise:
   receiving, from the computing device, a second request to create a second datastore, the second request indicating a second datastore type, from the plurality of datastore types, for the second datastore;
   selecting a second datastore configuration file, from the plurality of datastore configuration files, associated with the second datastore type;
   parsing the selected second datastore configuration file;
   rendering a second user interface for display on the computing device based on the parsing of the selected second datastore configuration file, the rendered second user interface being configured to receive user input from the computing device;
   receiving, from the computing device, a second user input via the rendered second user interface; and
   creating the second datastore based on the received second user input, the second datastore being of the second datastore type indicated by the second request.

3. The system of claim 1, wherein each one of the plurality of datastore configuration files comprises a corresponding Extensible Markup Language (XML) file.

4. The system of claim 1, wherein the rendered user interface comprises at least one field configured to receive user input from the computing device.

5. The system of claim 4, wherein the operations further comprise receiving the first user input via at least one graphic user interface element.

6. The system of claim 5, wherein the at least one graphic user interface element comprises at least one of a text field, a menu, and a checkbox.

7. The system of claim 1, wherein the operations further comprise automatically testing a connection with the first datastore in response to a user selection of the first datastore from a list of available datastores.

8. A computer-implemented method comprising:
   storing, by a machine having a memory and at least one hardware processor, a plurality of datastore configuration files, each one of the plurality of datastore configuration files being stored in association with a corresponding one of a plurality of datastore types, and each one of the plurality of datastore configuration files including parameters to be used in rendering a corresponding user interface to be used in creating a datastore of the corresponding one of the plurality of datastore types;
   receiving, from a computing device, a first request to create a first datastore, the first request indicating a first datastore type of the plurality of datastore types for the first datastore;
   selecting, from the plurality of datastore configuration files, a first datastore configuration file associated with the first datastore type;
   parsing the selected first datastore configuration file;
   rendering a first user interface for display on the computing device based on the parsing of the selected first datastore configuration file, the rendered first user interface being configured to receive user input from the computing device;
   receiving, from the computing device, a first user input via the rendered first user interface;

creating the first datastore based on the received first user input, the first datastore being of the first datastore type indicated by the first request;

receiving a request to add a new datastore type to the plurality of datastore types;

receiving a new datastore configuration file for the new datastore type;

storing the new datastore configuration file for the new datastore type, the new datastore configuration file being added to the plurality of datastore configuration files, and the new datastore type being added to the plurality of datastore types;

receiving metadata for the new datastore type;

storing the metadata in association with the new datastore type; and displaying, on the computing device, a selectable option to add the metadata to a new datastore based on the new datastore being of the new datastore type.

9. The computer-implemented method of claim 8, further comprising:

receiving, from the computing device, a second request to create a second datastore, the second request indicating a second datastore type, from the plurality of datastore types, for the second datastore;

selecting a second datastore configuration file, from the plurality of datastore configuration files, associated with the second datastore type;

parsing the selected second datastore configuration file;

rendering a second user interface for display on the computing device based on the parsing of the selected second datastore configuration file, the rendered second user interface being configured to receive user input from the computing device;

receiving, from the computing device, a second user input via the rendered second user interface; and creating the second datastore based on the received second user input, the second datastore being of the second datastore type indicated by the second request.

10. The computer-implemented method of claim 9, wherein each one of the plurality of datastore configuration files comprises a corresponding Extensible Markup Language (XML) file.

11. The computer-implemented method of claim 9, wherein the rendered user interface comprises at least one field configured to receive user input from the computing device.

12. The computer-implemented method of claim 11, further comprising receiving the first user input via at least one graphic user interface element.

13. The computer-implemented method of claim 12, wherein the at least one graphic user interface element comprises at least one of a text field, a menu, and a checkbox.

14. The computer-implemented method of claim 8, further comprising automatically testing a connection with the first datastore in response to a user selection of the first datastore from a list of available datastores.

15. A non-transitory machine-readable storage medium, tangibly embodying a set of instructions that, when executed by at least one processor, causes the at least one processor to perform operations comprising:

storing a plurality of datastore configuration files, each one of the plurality of datastore configuration files being stored in association with a corresponding one of a plurality of datastore types, and each one of the plurality of datastore configuration files including parameters to be used in rendering a corresponding user interface to be used in creating a datastore of the corresponding one of the plurality of datastore types;

receiving, from a computing device, a first request to create a first datastore, the first request indicating a first datastore type of the plurality of datastore types for the first datastore;

selecting, from the plurality of datastore configuration files, a first datastore configuration file associated with the first datastore type;

parsing the selected first datastore configuration file;

rendering a first user interface for display on the computing device based on the parsing of the selected first datastore configuration file, the rendered first user interface being configured to receive user input from the computing device;

receiving, from the computing device, a first user input via the rendered first user interface;

creating the first datastore based on the received first user input, the first datastore being of the first datastore type indicated by the first request;

receiving a request to add a new datastore type to the plurality of datastore types;

receiving a new datastore configuration file for the new datastore type;

storing the new datastore configuration file for the new datastore type, the new datastore configuration file being added to the plurality of datastore configuration files, and the new datastore type being added to the plurality of datastore types;

receiving metadata for the new datastore type;

storing the metadata in association with the new datastore type; and displaying, on the computing device, a selectable option to add the metadata to a new datastore based on the new datastore being of the new datastore type.

16. The storage medium of claim 15, wherein the operations further comprise:

receiving, from the computing device, a second request to create a second datastore, the second request indicating a second datastore type, from the plurality of datastore types, for the second datastore;

selecting a second datastore configuration file, from the plurality of datastore configuration files, associated with the second datastore type;

parsing the selected second datastore configuration file;

rendering a second user interface for display on the computing device based on the parsing of the selected second datastore configuration file, the rendered second user interface being configured to receive user input from the computing device;

receiving, from the computing device, a second user input via the rendered second user interface; and creating the second datastore based on the received second user input, the second datastore being of the second datastore type indicated by the second request.

17. The storage medium of claim 15, wherein each one of the plurality of datastore configuration files comprises a corresponding Extensible Markup Language (XML) file.

18. The storage medium of claim 15, wherein the rendered user interface comprises at least one field configured to receive user input from the computing device.

19. The storage medium of claim 18, wherein the operations further comprise receiving the first user input via at least one graphic user interface element.

20. The non-transitory machine-readable storage medium of claim 15, wherein the operations further comprise automatically testing a connection with the first datastore in response to a user selection of the first datastore from a list of available datastores.

\* \* \* \* \*